United States Patent [19]

Uemori et al.

[11] 4,237,639
[45] Dec. 9, 1980

[54] TELESCOPIC FISHING ROD HAVING MEANS FOR EXTENDING AND CONTRACTING SAME

[76] Inventors: Yukio Uemori; Shigeko Uemori; Terue Uemori; Michie Uemori, all of 43-22, Ichiban-2-chome, Atsuta-ku; Tuguo Kamoshita; Masako Kamoshita, both of 45, Enbacho-1-chome, Nishi-ku, Nagoya, all of Japan

[21] Appl. No.: 67,128

[22] Filed: Aug. 16, 1979

[30] Foreign Application Priority Data

Nov. 30, 1978 [JP] Japan .................. 53-165269

[51] Int. Cl.³ .......................................... A01K 87/00
[52] U.S. Cl. ...................................................... 43/18 R
[58] Field of Search ............... 43/18 R, 18 GF, 19.2, 43/20, 21

[56] References Cited

U.S. PATENT DOCUMENTS

| | | | |
|---|---|---|---|
| 1,310,452 | 7/1919 | Sliwinski | 43/18 R |
| 2,276,524 | 3/1942 | Taylor | 43/18 R |
| 2,874,507 | 2/1959 | Faber | 43/18 R |
| 3,789,533 | 2/1974 | Bowerfind | 43/18 R |
| 3,927,486 | 12/1975 | Yuen | 43/20 |

Primary Examiner—Nicholas P. Godici
Attorney, Agent, or Firm—Norbert P. Holler

[57] ABSTRACT

A telescopic fishing rod including a plurality of rod elements, a terminal rod portion and a fishing rod extending and contracting device including a reel having an elongated member wound thereon, the elongated member being connected at one end to the reel and at the other end to the rear end of the terminal rod portion, a spiral spring supported coaxially with the reel, a feed gear for feeding the elongated member having a ratchet-and-pawl arrangement connected unitarily therewith, a knob for bringing the pawl into and out of engagement with the ratchet wheel, and a handle lever for turning the reel to pay the elongated member out of the reel. The elongated member wound on the reel when the fishing rod is in a contracted state is paid out of the reel as the handle lever is turned to thereby rotate the reel and cause the rod elements and terminal rod portion to slide out one from another while energy is stored in the spiral spring as the latter is compressed, thereby bringing the fishing rod to an extended state. The extended fishing rod can be automatically contracted if the energy stored in the spiral spring is released by pushing the knob downwardly to bring the pawl out of engagement with the ratchet wheel.

8 Claims, 3 Drawing Figures

TELESCOPIC FISHING ROD HAVING MEANS FOR EXTENDING AND CONTRACTING SAME

BACKGROUND OF THE INVENTION

This invention relates to fishing rods in general, and more particularly to a telescopic fishing rod that can be extended and contracted by turning a handle.

We have developed a telescopic fishing rod having a built-in device for extending the fishing rod by utilizing the restitution elasticity of a coil spring for actuating a push-out shaft to cause rod elements to slide out of a grip rod element to obtain full extension of the fishing rod. This device for extending the telescopic fishing rod is constructed such that the push-out shaft for causing extension of the rod elements contained in the grip rod element to take place is fitted in the grip rod element, and the coil spring is mounted for cooperation with the push-out shaft. The coil spring is in a compressed state but the energy retained by the spring is released when a lever or a pushbutton is manipulated so that the restitution elasticity of the coil spring causes the push-out shaft to push the rod elements out of the grip rod element to achieve full extension of the fishing rod in a short period of time.

In a telescopic fishing rod provided with the aforesaid type of device for extending the fishing rod, the fishing rod in a contracted state can be readily brought to an extended state by using a relatively simple construction. However, difficulties have hitherto been experienced in causing the aforesaid type of device to perform the function of automatically bringing the fishing rod in an extended state to a contracted state, because this makes the construction of the device complex and there are some technical problems that have to be solved. Also, the aforesaid type of device for bringing a fishing rod from a contracted state to an extended state by utilizing the restitution elasticity of a compression spring has the possibility of causing injury to persons because the rod elements slide one out of another quickly with a great force. This has made it necessary to provide a suitable safety device to the fishing rod to ensure that the device operates safely. Thus there has hitherto been available no device which is capable of both extending and contracting a telescopic fishing rod to the satisfaction of those who use this type of fishing rod without causing any injury to other persons.

SUMMARY OF THE INVENTION

This invention has as its object the provision of a telescopic fishing rod provided with a device for extending and contracting the fishing rod which obviates the aforesaid disadvantages of the prior art.

The characteristic features of the present invention are that the device for bringing rod elements of the telescopic fishing rods from a contracted state to an extended state and vice versa comprises a take-up reel having an elongated, web-like member wound thereon for extending and contracting the fishing rod, a spiral spring fitted to the take-up reel, a gear having a ratchet-and-pawl arrangement coaxially fixed thereto, and a handle. When the handle is manually turned, the gear rotates and pulls the elongated, web-like member out of the take-up reel. As the elongated, web-like member is paid out of the take-up reel, the latter rotates and compresses the spiral spring to store energy therein. When it is desired to bring the fishing rod from an extended state to a contracted state, one has only to manipulate a knob to release the pawl from engagement with the ratchet wheel. This releases the energy stored in the spiral spring, so that the take-up reel is automatically rotated in a direction in which the elongated, web-like member is wound on the take-up reel, thereby bringing the fishing rod to a contracted state.

DESCRIPTION OF THE PREFERRED EMBODIMENT

Figure 1:
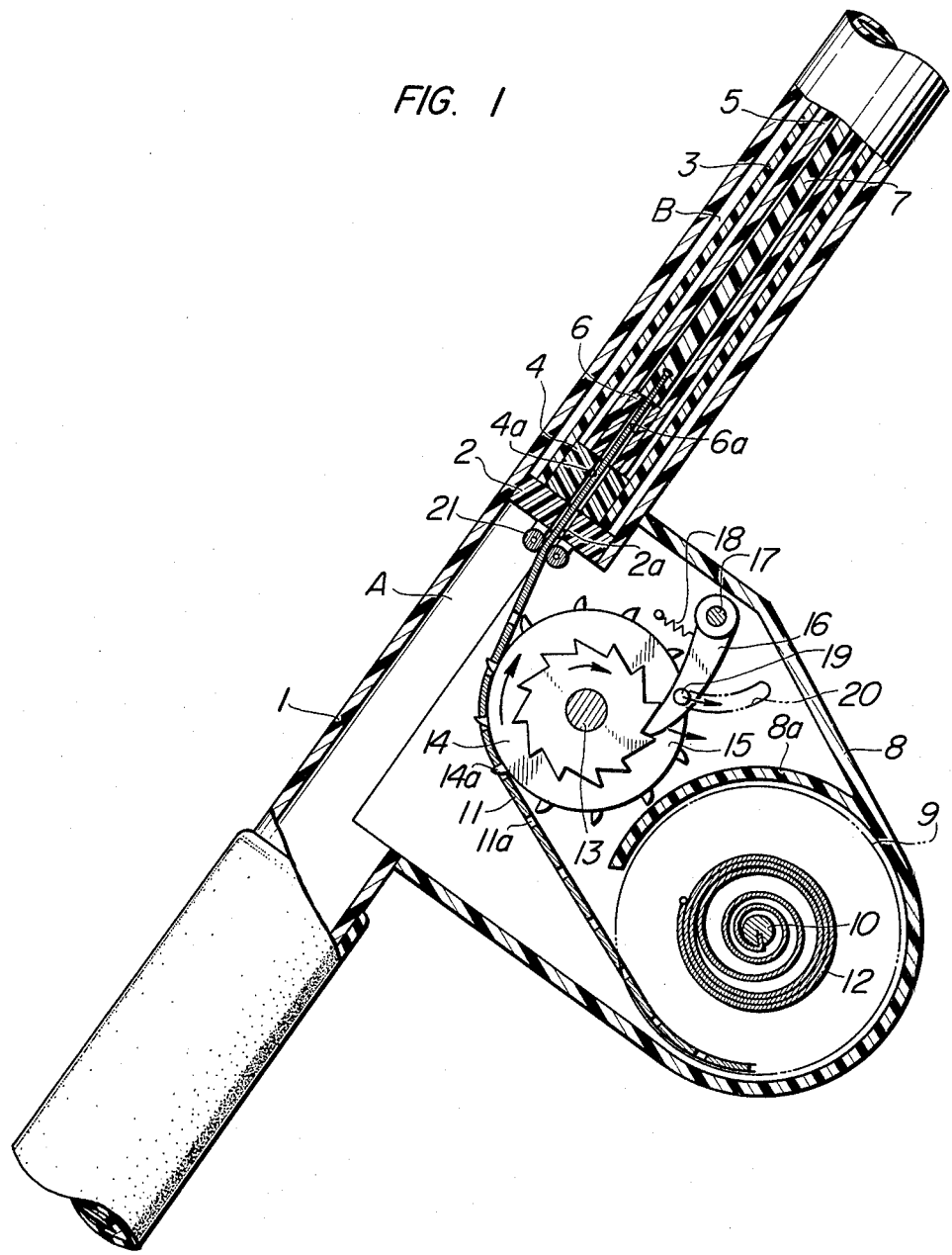
FIG. 1 is a vertical sectional view of the essential portions of the telescopic fishing rod in a contracted state having a device for extending and contracting same comprising one embodiment of the present invention.
Figure 2:
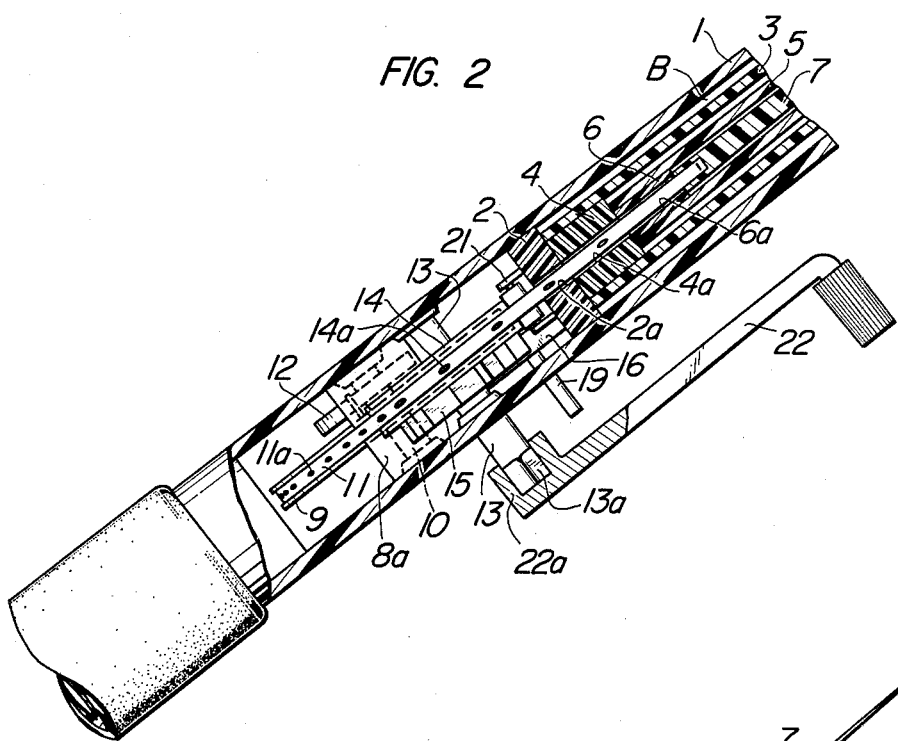
FIG. 2 is a transverse sectional view of the fishing rod shown in FIG. 1.

A preferred embodiment of the present invention will now be described by referring to the accompanying drawings. The telescopic fishing rod according to the invention comprises a grip rod element 1 substantially cylindrical in form having a stopper 2 fitted to its cylindrical interior to divide the grip rod element 1 into a base compartment A and a rod element containing compartment B. The stopper 2 is formed in its center with a horizontally extending slit 2a. The telescopic fishing rod also comprises an intermediate rod member 3 substantially cylindrical in form having a stopper 4 fitted to the rear end thereof, the stopper 4 being formed in its center with a horizontally extending slit 4a substantially similar to the slit 2a. The telescopic fishing rod also comprises a forward rod element 5 substantially cylindrical in form having a stopper 6 fitted to the rear end thereof, the stopper 6 being formed in its center with a horizontally extending slit 6a substantially similar to the slits 2a and 4a. The forward rod element 5 has telescopically connected thereto a terminal rod portion 7. As shown in FIGS. 1 and 2, the intermediate rod element 3, forward rod element 5 and terminal rod portion 7 slide one into another and they are all contained in the rod element containing compartment B of the grip rod element 1 when the telescopic fishing rod is brough to a contracted state.

A case 8 is secured to the grip rod element 1 in the vicinity of the stopper 2 in a manner to depend from the rod and is in communication with the base compartment A. Secured to the lower portion of the case 8 is a reel shaft 10 for supporting a reel 9 for rotation. A spiral spring 12 is fitted to the reel 9 in such a manner that its inner end is connected to the reel shaft 10 and its outer end is connected to the reel 9, so that when the reel 9 rotates the spiral spring 12 is compressed. A feed gear 14 formed on its outer periphery with a plurality of feed teeth 14a is supported for rotation on a shaft 13 secured to the case 8 in a position above the reel 9 and having a square end portion 13a extending outwardly of the case 8. A ratchet wheel 15 is secured to one side of the feed gear 14 unitarily therewith to be supported by the shaft 13. A pawl 16 is pivotally supported at its base by a shaft 17 secured to the upper portion of the case 8, and is urged by the biasing force of a coil spring 18 mounted between the case 8 and the pawl 16 into engagement at its forward end with one of the teeth of the ratchet wheel 15, to normally prevent the ratchet wheel 15 and hence the feed gear 14 from rotating in a direction opposite to the direction indicated by an arrow in FIG. 1. A knob 19 is secured to one side of the forward end portion of the pawl 16 and projects outwardly of the case 8 through an arcuate slot 20 formed in one side wall of the case 8. The knob 19 can be gripped from outside and moved along the arcuate slot 20 so as to bring the pawl 16 out of engagement with the ratchet wheel 15.

A guide roller 21 is located for rotation on either vertical side of the horizontally extending slit 2a on the side of the stopper 2 that faces the base compartment A of the grip rod element 1. A web 11 of thin steel formed with a plurality of holes 11a arranged longitudinally of the web 11 and spaced equidistantly from one another a distance equal to the pitch of the feed teeth 14a of the feed gear 14 is connected at one end thereof to the reel 9 and wound thereon. Preferably, the steel web 11 is curved in a cross section perpendicular to the length thereof. The steel web 11 wound on the reel in this way is connected at the other end to the rear end of the terminal rod portion 7, and has its holes 11a penetrated by the feed teeth 14a of the feed gear 14 as it is trained over a portion of the outer periphery of the feed gear 14. The steel web 11 then passes between the guide rollers 21 and through the horizontally extending slits 2a, 4a and 6a formed in the stoppers 2, 4 and 6 of the grip rod element 1, intermediate rod element 3 and forward rod element 5 respectively of the fishing rod. In FIGS. 1 and 2, the spiral spring 12 is in its expanded state and brough to a compressed state when the steel web 11 is paid out of the reel 9, to store energy in the spiral spring 12. The energy thus stored in the spiral spring 12 is released when the spiral spring 12 is brought to an expanded state, thereby permitting the steel web 11 to be wound on the reel 9. Preferably, the steel web 11 is formed of spring steel or other steel of high resilience. When the steel web 11 is wound on the reel 9, the telescopic fishing rod is brought to a completely contracted state in which the intermediate rod element 3, forward rod element 5 and terminal rod portion 7 are contained in the grip rod element 1 in such a manner that the rear end of the intermediate rod element 5 abuts against the stopper 2 in the grip rod element 1, the rear end of the forward rod element 5 abuts against the stopper 4 in the intermediate rod element 3 and the rear end of the terminal rod portion 7 abuts against the stopper 6 in the forward rod element 5. Also, the pawl 16 is in engagement with the ratchet wheel 15.

A handle lever 22 is detachably connected to the shaft 13 supporting the feed gear 14 and the ratchet wheel 15 in such a manner that the square end portion 13a of the shaft 13 is fitted into a square space formed in a projection 22a at one side of the handle lever 22. The steel web 11 is rectangular in cross section so that the web 11 can move smoothly through the horizontally extending slits 2a, 4a and 6a formed in the stoppers 2, 4 and 6 respectively. In the drawings, the numeral 8a designates a reel cover of the case 8.

Figure 3:
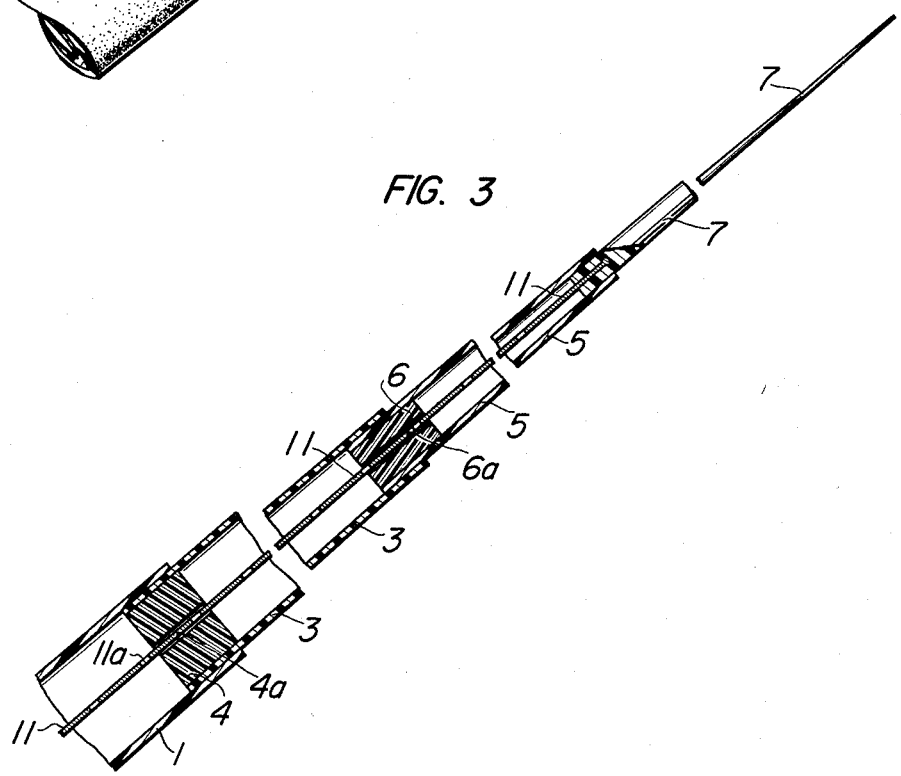
FIG. 3 is a vertical sectional view of the rod elements of the telescopic fishing rod shown in FIG. 1, in explanation of the manner in which the rod elements are in engagement with each other when the fishing rod is in an extended state.

The operation of the device for extending and contracting the telescopic fishing rod constructed as aforesaid will now be described. The operation will first be described with regard to extending of the fishing rod from a contracted state shown in FIGS. 1 and 2 to an extended state shown in FIG. 3. The grip rod element 1 is gripped at its base by one hand (left hand) and the handle lever 22 is turned by the other hand (righ hand) to rotate the feed gear 14 in the direction indicated by an arrow in FIG. 1, to pay the steel web 11 out of the reel 9 as the steel web 11 is withdrawn from the reel 9 by the action of the feed teeth 14 engaged in the holes 11. As the reel 9 is rotated, the spiral spring 12 is compressed to store energy therein. As the steel web 11 is moved through the horizontally extending slits 2a, 4a and 6a successively, the terminating rod portion 7 is first pushed out of the forward rod element 5. The terminating rod portion 7 is tapering in going from its base toward its forward end, and the forward rod element 5 has its inner and outer diameters successively reduced in going from its base toward its forward end. Thus as the terminating rod portion 7 gradually moves forwardly, the rear end of the terminating rod portion 7 of large diameter is brought into frictional contact with the inner wall surface of the forward rod element 5 of reduced diameter, and the terminating rod portion 7 stops. Further turning of the handle lever 22 moves the steel web 11 forwardly to thereby move the forward rod element 5, which now unitarily holds at its forward end the terminating rod portion 7, forwardly in the intermediate rod element 3. The intermediate rod element 3 also has its inner and outer diameters successively reduced in going from its base toward its forward end, so that further forward movement of the steel web 11 brings the rear end of the forward rod element 5 into frictional contact with the inner wall surface of the forward end of the intermediate rod portion 3. As a result, the forward rod element 5 stops, and further forward movement of the steel web 11 moves the intermediate rod element 3, which not unitarily holds at its forward end the forward rod element 5 and terminating rod portion 7, forwardly in the rod element containing compartment B of the grip rod element 1. When the intermediate rod portion 3 is brought into frictional contact at its rear end with the inner wall surface of the forward end of the grip rod element 1, the intermediate rod element 3, forward rod element 5 and terminating rod portion 7 are all extended to the full. That is, the telescopic fishing rod is brought to a completely extended state.

As the steel web 11 is successively paid out of the reel 9 and moved forwardly, rotation of the reel 9 compresses the spiral spring 12 and causes energy to be stored therein as aforesaid. When the telescopic fishing rod is brought to a fully extended state, the spiral spring 12 is fully compressed and retains enough energy to move the steel web 11 backwardly to thereby telescopically cause the intermediate rod element 3, forward rod element 5 and terminating rod portion 7 to slide one into another and into the rod element containing compartment B of the grip rod element 1. Even if the hand is released from the handle lever 22 at this time, the pawl 16 in engagement with the ratchet wheel 15 prevents the feed gear 14 from moving in a direction in which the steel web 11 is wound on the reel 9, thereby ensuring that the fishing rod is maintained in a fully extended state.

When it is desired to bring the telescopic fishing rod from its fully extended state to its contracted state, the knob 19 is pressed downwardly along the arcuate slot 20 in the direction of the arrow shown in FIG. 1. This causes the pawl 16 to move in pivotal movement about shaft 17 against the biasing force of the coil spring 18, out of engagement with the ratchet wheel 15. This renders the feed gear 14 free to move in any direction and releases the energy stored in the spiral spring 12, so that the reel 9 rotates vigorously to wind the steel web 11, which has been paid out, thereon while the feed gear 14 is rotated by the backward movement of the steel web 11. The backward movement of the steel web 11 causes the terminating rod portion 7, to which the forward end of the steel web 11 is connected, to move backwardly in the forward rod element 5 until it abuts against the stopper 6. Then the forward rod element 5 and the terminating rod portion 7 move backwardly in the intermediate rod element 3 until the forward rod element 5 abuts against the stopper 4, and thereafter the intermediate rod element 3, forward rod element 5 and terminating rod portion 7 move backwardly in the rod element containing compartment B of the grip rod element 1 until the intermediate rod element 3 abuts against the stopper 2. Thus the telescopic fishing rod is automatically brought to its fully contracted state shown in FIGS. 1 and 2 by a single action of moving the knob 19 downwardly. It is to be understood that the order in which the terminating rod portion 7, forward rod element 5 and intermediate rod element 5 are telescopically moved one into another and into the grip rod element 1 may differ from the order described hereinabove depending on the condition of frictional contact between the rod elements themselves and between the rod elements and the terminal rod portion.

From the foregoing description, it will be appreciated that the telescopic fishing rod according to the present invention is provided with a fishing rod extending and contracting device comprising case 8 attached to grip rod element 1 of the fishing rod, reel 9 supported for rotation by shaft 10 secured to case 8 and having steel web 11 connected thereto at one end and formed with a plurality of holes 11a equidistantly arranged longitudinally thereof, steel web 11 passing through horizontally extending slits 2a, 4a and 6a formed in stoppers 2, 4 and 6, intermediate rod element 3 and forward rod element 5 respectively of the fishing rod and connected at the other end to the rear end of terminal rod portion 7, feed gear 14 having teeth 14a on its periphery for engagement in holes 11a in steel web 11 and supported by shaft 13 secured to case 8, ratchet-and-pawl arrangement 15 and 16 supported coaxially and unitarily with feed gear 14, knob 19 extending through arcuate slot 20 out of case 8 for bringing pawl 16 into and out of engagement with ratchet wheel 15, and handle lever 22 connected to shaft 13. When handle lever 22 is manually turned, the steel web 11 is paid out of the reel 9 by the feed action of the feed gear 14 to cause the terminal rod portion 7, forward rod element 5, intermediate rod element 3 and grip rod element 1 to slide one from another in the indicated order in the orderly manner, thereby making it possible to bring the fishing rod to a fully extended state. Simultaneously as the reel 9 is rotated about shaft 10 by turning the handle lever 22 to pay out the steel web 11, the spiral spring 12 is compressed to store energy therein. By merely pushing the knob 19 downwardly by hand, it is possible to release the pawl 16 from engagement with the ratchet wheel 15 to thereby release the energy stored in the spiral spring 12 to automatically wind the steel web 11 on the reel 9, so that the fishing rod can be brought to a contracted state rapidly and smoothly. According to the present invention, the fishing rod can be brought to an extended state at any speed as desired, either slowly or quickly, because the fishing rod is extended by manually turning the handle lever 22 to rotate the feed gear 14. However, when the fishing rod is brought to a contracted state, the operation is performed automatically and rapidly in an instant because the energy stored in the spiral spring 12 is the motive force for rotating the reel 9. By this feature, the fishing rod can be handled safely without any trouble.

What is claimed is:

1. A telescopic fishing rod having means for extending and contracting same, comprising:
    a main rod body having a rear portion serving as a grip and formed with an opening at its forward end portion, said main rod body being hollow and having a space therein;
    a plurality of rod elements telescopically slidable in and out of one another and said main rod body through said opening at the forward end portion thereof to be contained in said space in said hollow main rod body;
    an elongated power-transmitting member connected at one end thereof to the rear end of the rod element remotest from said main rod body;
    means for paying out and winding said elongated power-transmitting member having the other end of said elongated power-transmitting member connected thereto; and
    means operative to store energy therein as said elongated power-transmitting member paying out and winding means is operated to pay out said elongated power-transmitting member, so that said elongated power-transmitting member can be automatically wound when the energy is released;
    the telescopic movement of said rod elements to slide into and out of one another and said main rod body being performed such that the rod element remotest from said main rod body is first moved by said elongated power-transmitting member as the latter is actuated and the movement of the rod element remotest from the main rod body is successively transmitted to the rest of the rod elements, thereby enabling the fishing rod to be telescopically brought from a contracted state to an extended state and vice versa.

2. A telescopic fishing rod as set forth in claim 1, wherein the inner and outer diameters of said rod elements become successively smaller in going from said main rod body toward said rod element remotest from the main rod body, the rod element remotest from the main rod body is solid and the rest of the rod elements are hollow, said hollow rod elements have their inner and outer diameters successively reduced in going from their rear ends toward their forward ends so that the rear end of the inner rod element is brought into frictional contact with the forward end of the outer rod element, when the fishing rod is extended, to rigidly secure the rod elements to one another, and the main rod body and the rod elements excepting the rod element remotest from the main rod body each have a stopper fitted to the rear end thereof serving as the bottom of the hollow space and formed with a slit for the elongated power-transmitting member to pass therethrough.

3. A telescopic fishing rod as set forth in claim 1, wherein said elongated power-transmitting member is a resilient member of the web form of spring steel.

4. A telescopic fishing rod as set forth in claim 1 or 3, wherein said elongated power-transmitting member is formed with small holes disposed equidistantly from one another longitudinally of the elongated power-transmitting member.

5. A telescopic fishing rod as set forth in claim 4, wherein said means for paying out and winding the elongated power-transmitting member comprises a reel rotatable about its own axis for paying out the elongated power-transmitting member or winding same depending on the direction of its rotation, and a wheel rotatable about its own axis located along the path of movement of said elongated power-transmitting member from said reel toward said rod elements, said rotatable wheel being in contact with said elongated power-transmitting member and having means for controlling the movement of said elongated power-transmitting member.

6. A telescopic fishing rod as set forth in claim 5, wherein said means for controlling the movement of said elongated power-transmitting member comprises a ratchet wheel secured to said rotatable wheel, a pawl pivotally supported to be brought into and out of engagement with said ratchet wheel, said pawl being normally urged by the biasing force of a spring to be in engagement with said ratchet wheel, and a plurality of projections formed on the outer periphery of said rotatable wheel and equidistantly spaced from one another for engagement in said small holes formed in said elongated power-transmitting member.

7. A telescopic fishing rod as set forth in claim 5, wherein said means for paying out and winding the elongated power-transmitting member further comprises a handle lever detachably connected to a shaft supporting said rotatable wheel.

8. A telescopic fishing rod as set forth in claim 1, wherein said means operative to store energy therein as said elongated power-transmitting member is paid out comprises a spiral spring that is compressed when said elongated power-transmitting member is paid out by said means for paying out or winding said elongated power-transmitting member.

* * * * *